United States Patent [19]

McMillan

[11] 4,317,507

[45] Mar. 2, 1982

[54] EMERGENCY BRAKING SYSTEM

[76] Inventor: Robert E. McMillan, 171 Orange Rd., Montclair, N.J. 07042

[21] Appl. No.: 129,230

[22] Filed: Mar. 11, 1980

[51] Int. Cl.³ .............................................. B60T 1/14
[52] U.S. Cl. ..................................... 188/5; 188/2 R; 188/6
[58] Field of Search ................... 188/1 R, 5, 6, 7, 2 R, 188/188; 242/170, 159

[56] References Cited

U.S. PATENT DOCUMENTS

| 2,973,911 | 3/1961 | Rayburn | 242/159 X |
| 3,187,705 | 6/1965 | Costello et al. | 242/170 X |
| 3,799,293 | 3/1974 | Howells et al. | 188/5 |

FOREIGN PATENT DOCUMENTS

| 1755039 | 12/1971 | Fed. Rep. of Germany | 188/6 |
| 2611867 | 9/1977 | Fed. Rep. of Germany | 188/5 |
| 1463459 | 12/1966 | France | 188/6 |

OTHER PUBLICATIONS

Lasswell, F., "Snuffy Smith", in Washington Post, Saturday, Oct. 30, 1971.

Primary Examiner—Ralph J. Hill
Attorney, Agent, or Firm—Stephen E. Feldman; Marvin Feldman

[57] ABSTRACT

An emergency braking system is operably associated with a vehicle operated on a road surface. The system comprises an anchor device releasably carried by the vehicle for adherence to the road surface. An activation device in the vehicle releases the anchor device from the vehicle. Cable apparatus joins the anchor device to the vehicle for braking the movement of the vehicle when the anchor device is adhered to the road surface. One embodiment of the invention includes a vacuum housing device which acts as an anchor. This embodiment provides a vacuum housing structure which adheres to the road surface by means of a vacuum. A second embodiment employes an explosively driven stud, spike or bolt anchor device for imbedding a stud, spike or bolt anchor into the road surface. A third embodiment discloses a spike which is driven into the road surface by the weight of the vehicle.

16 Claims, 7 Drawing Figures

U.S. Patent  Mar. 2, 1982  Sheet 1 of 2  4,317,507
FIG.1
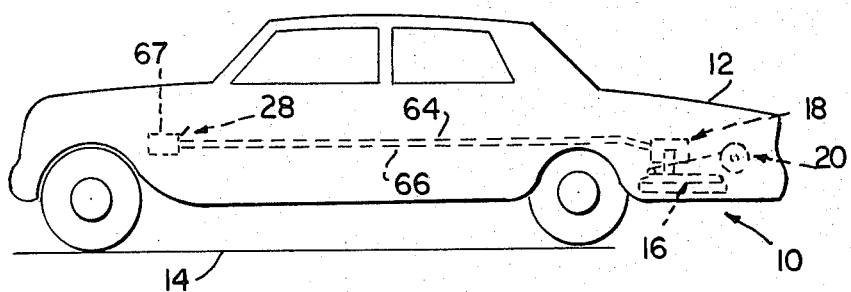
FIG.2
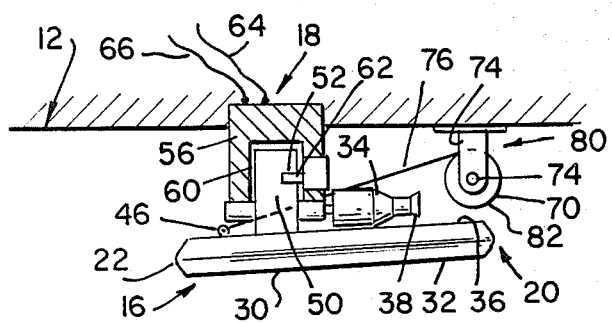
FIG.3
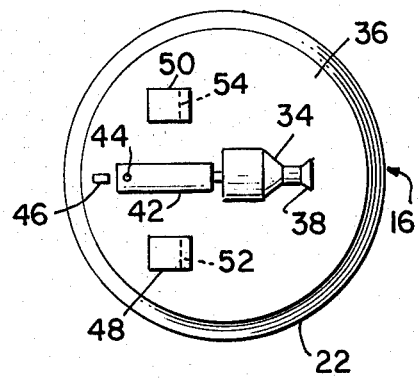
FIG.4
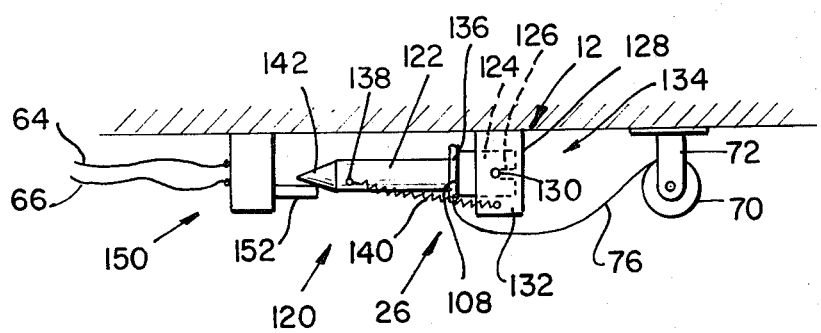
FIG.5

EMERGENCY BRAKING SYSTEM

BACKGROUND OF THE INVENTION

While the invention is subject to a wide range of applications, it is especially suited for use in conjunction with a vehicle braking system and will be particularly described in that connection.

The automobile accidents each year costs many lives as well as a huge member of injuries with either permanent or short-term disability. A secondary consideration is the huge financial loss due to these accidents.

Very often, accidents could be prevented with an improvement in the braking system. Whether drum or disc brakes are used, the weak link in the braking scheme is the ultimate dependence on the tire road interface. Recently, progress has been made with the introduction of nonskid, computerized braking which can give up to 85% of the friction force of dry pavement on a wet day. However, a surface covered with wet ice, or dry sand provides considerably less friction force for stopping.

The stopping distance of a car is inversely proportional to the braking force. For example, a 0.2G braking (wet or icy surface) allows a car to stop after approximately 600 feet. In comparison, a 2G braking force permits the car to stop in approximately 60 feet. In general, under wet and/or icy conditions, a 0.2G braking force is generally provided and therefore the car stops after quite some distance.

In many potential accidents, distances of hundreds of feet before the collision exist when the possible collision is first perceived or able to be perceived. Thus, if a supplemental system could supply an extra amount of braking such as for example, 1.5G, the possibility to avoid accidents would be enormously increased. In the past, several emergency braking systems have been provided to quickly slow down a car.

U.S. Pat. No. 2,319,297 to Cieri discloses an emergency brake for vehicles which are adapted to contact the road for preventing skidding. The invention includes a claw shaped member which engages the road surface.

U.S. Pat. No. 3,799,293 provides for example, "an emergency braking pad which can substantially instantaneously be lowered to the road and be held against the road surface by atmospheric pressure for decelerating the vehicle without altering the other normal pressures on the vehicle."

It is an object of the present invention to provide an emergency braking system which brakes a vehicle independent of the tire-road interface.

It is a further object of the present invention to provide an emergency braking system where the braking force can be controlled.

It is a still further object of the present invention to provide an emergency braking system which can be used independent of a primary braking system on a vehicle.

It is a yet further object of the present invention to provide an emergency braking system which can be quickely and easily activated.

It is a still further object of the present invention to provide an emergency braking system which is relatively inexpensive to manufacture.

SUMMARY OF THE INVENTION

Accordingly, there has been provided an emergency braking system which is operatively associated with a vehicle operated on a road surface. The system comprises an anchor device releasably carried by the vehicle for adherence to the road surface. An activation device in the vehicle releases the anchor device from the vehicle. Cable apparatus joins the anchor device to the vehicle for braking the movement of the vehicle when the anchor device is adhered to the road surface. One embodiment of the invention includes a vacuum housing device which acts as an anchor. This embodiment provides a vacuum housing structure which adheres to the road surface by means of a vacuum. A second embodiment employs an exlosively driven bolt device for imbedding a bolt into the road surface. A further embodiment discloses a spike which is driven into the road surface by the weight of the vehicle.

For a better understanding of the present invention, together with other and further objects thereof, reference is had to the following description, taken in connection with the accompanying drawings, while its scope will be pointed out in the appended claims.

BRIEF DESCRIPTION OF THE DRAWINGS

FIG. 1 is a diagrammatical side elevational view of an automobile having an emergency brake in accordance with the present invention.

FIG. 2 is an enlarged side elevation view of a portion of the brake of FIG. 1 showing the structure holding a vacuum housing against the vehicle;

FIG. 3 is a top view of a jet induced vacuum device;

FIG. 4 is a side view of a second embodiment of an anchor device including an explosively driven bolt spike device;

FIG. 5 is a side view of a third embodiment of an anchor device including a pivotable spike;

DESCRIPTION OF THE PREFERRED EMBODIMENTS OF THE INVENTION

Figure 6:
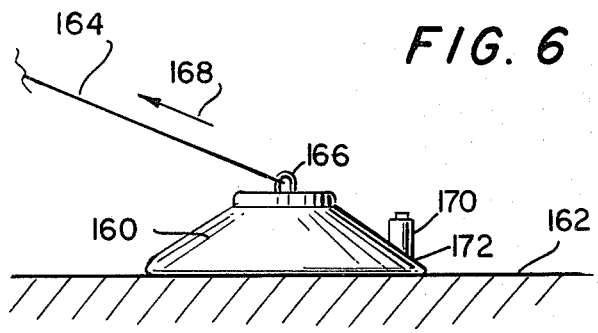
FIG. 6 is an enlarged side elevation view showing the use of a small rocket in addition to the gas generative rocket, to add to downward thrust, and particularly to prevent tilting of the suction cup.

An emergency braking system 10 is operatively associated with a vehicle 12 that is operated on a road surface 14. An anchor device 16 is releasably carried by the vehicle for adherence to the road surface. An actuation device 18 in the vehicle releases the anchor device from the vehicle. Cable structure 20 joins the anchor device 16 to the vehicle 12 for braking the movement of the vehicle when the anchor device 16 is adhered to the road surface 14. One embodiment of the present invention uses a vacuum housing structure 22 for adherence to the road surface. A second embodiment includes an explosive bolt 100 for adherence to the road surface. A third embodiment sets forth a spike device 26 for adherence of the anchor device to the road surface.

Referring to FIG. 1, there is shown an emergency braking system 10 located in a vehicle 12. An anchor device 16 is affixed to the vehicle by means of an actuation device 18. A cable structure 20 which is connected to the frame of the vehicle is attached to the anchor device. An electrical control system 28 activates the actuation device when required and will be further described below.

Referring to FIGS. 2 and 3, there is shown an enlarged view of an anchor device 16 which is comprised of a vacuum housing structure 22 that has a cup-shaped suction chamber 30 surrounded about its periphery by a seal device 32. The seal may be formed of any flexible material, such as for example, rubber. A conventional jet pump motor device 34 is mounted on the top surface 36 of the vacuum structure to create and maintain a vacuum within the cup-shaped chamber. The chamber 30 may include a rearwardly extending verturi type exhaust 38 and, at its forward end the exhaust or jet passage of the jet pump motor 42, which is shown as a rocket fuel motor with an electrically ignitable squib 44. This jet pump is of the type disclosed and illustrated in U.S. Pat. No. 3,799,293 mentioned above. When the squib ignites the rocket fuel, the escaping gases entrain air in the chamber 30 and carries the air with the combustion gases from the exhaust 38. The air in the chamber 30 is exhausted to create a lower pressure, such as for example, 1.5 psi. Then the atmospheric pressure forces the housing structure 22 and the seal 32 against the road surface so that the anchor device adheres to the road surface.

Although a single pump and jet passage 34 are illustrated as being in the center of the housing structure 22, it is within the scope of the present invention to use one or more pumps and exhaust passages or small rockets along the rear edge of the housing structure furthermost from the front of the car. These additional pumps or rockets would provide downward thrust to prevent tilting of the cup-shaped chamber because of the cable tension. This tilting may allow more spilling air into the vacuum than the gas-driven pump can accomodate and must, therefore, be minimized or eliminated. This arrangement is shown in FIG. 6, which includes a housing structure or suction cup 160 disposed on a road surface 162. Tilting force is applied to member 160 via cable force 164 acting against top connecting loop 166 in the direction indicated by arrow 168. As shown, a pump and exhaust passage or small rocket 170 is disposed at the rear edge 172 of the housing structure or suction cup 160; the rocket 170 being applied at edge 172 to counter-act tilting force exerted via cable 164, by producing tilting torque. In addition, it is within the scope of the present invention to use any type of evacuation device such as a gas generator for evacuating the cup-shaped chamber.

A hook device 46 is provided on the top surface 36 of the housing structure in order to provide a connection point for the cable as will be further described.

An actuation device 18 releases the anchor from the vehicle. It may include two members 48 and 50 which extend upward from the top surface of the vacuum structure. Each of these members may be rectangular in cross-section and have a notch 52 and 54 extending through the width of the members. The actuation device also may include two locking members 56 and 58 (the latter is not illustrated) which are substantially identical and may be securely fixed to the frame of the vehicle. Each of the members has a passageway 60 which has a cross-section of a size to slidably receive the members 48 and 50. A solenoid actuated pin 62 extends into the passageway to engage the notches 52 and 54 when the members are in the passageway and thereby fasten the member and the locking members together. Wires 64 and 66 extend to an actuator 28 whereby the pin 62 may be moved out of the notches so that the members slide out of the passageways 60 and allow the weight of the anchor to drop the latter onto the road surface. The actuator 28 may include a switch 67 or any other conventional actuator. Although a preferred embodiment of the actuation device has been described and illustrated, it is within the scope of the present invention to use any desired type of actuation device which serves the function of holding the vacuum housing structure onto the vehicle in the normal operation of the vehicle and includes a means to release the structure so that it can drop to the road surface and perform the braking function as will be further described herein. A device to generate a hydraulic gas, or explosive thrust can be provided on the housing structure to propel the suction anchor onto the road surface.

A cable structure 20 includes a reel 70 which is rotably attached to support members 72, affixed to the frame of the vehicle, and located on either end of the reel 70. An axle 74 extends through the reel and is attached to the support members 72 whereby the reel can rotate around the axle 74 to dispense a cable 76. The cable may be made of any strong, flexible material such as for example, steel. The cable is connected at one end to the reel 70 and at its other end to the hook device 46 provided on the vacuum housing structure as described below.

A frictional control device 80 is associated with the reel 70 to regulate the payout of the cable 76. This frictional control may be a soft material matrix around the reel with the cable imbedded therein so that the payout of the cable requires the cable to be torn out of the material matrix. This soft material matrix is preferably formed of materials such as for example, solder or plastic which are chosen to regulate the speed at which the cable is paid out. It is within the scope of the invention to use any desired type of material which is able to perform this function.

The material matrix may be of graded toughness around the reel, such as with the toughness increasing from the outer periphery of the reel towards the center of the reel. The graded toughness causes a relatively small deceleration force ("G") to be encountered by the occupant of the vehicle when the anchor is first adhered to the road surface. This gives the occupant of the vehicle an opportunity to brace himself as the magnitude of the force increases when more of the cable is payed out from the tougher portion of the matrix. The cable is payed out at a slower speed as more of the cable is unwound from the reel.

It is also contemplated within the invention to use other types of frictional control device such as clamping the ends of the axle 74 where it passes through the support member 72 of in any other desired place. This frictional control could be a bolt screwed through the support member to press against the axle 74. Also, conventional drum or disc brakes similar to normal automotive brakes might be used.

In order to more fully understand the present invention, a description of its operation follows. In the event that a vehicle 12 travelling along a road surface 14 must suddenly brake, it may be that the road conditions do not permit the primary braking system to stop the vehicle within the required distance. In such an event, the actuation device 18 is activated by the switch 67. This causes the pins 62 located in the locking members 58 to be withdrawn so that the weight of the vacuum housing structure 22 pulls the members 48 and 50 out of the passageways 60 in the locking members 56. At the same time that the anchor device is being released from the vehicle, the actuation device may also ignite the fuel located within the jet pump motor 34 by means of the squib 44. Thus, when the vacuum housing structure contacts the road surface, the cup-shaped chamber is facing the road surface and the seal device creates an air chamber whereby the escaping gases from the motor pass through the pump device and out of a venturi-type exhaust 38. This decrease in pressure within the cup-shaped chamber causes the atmospheric pressure to act on the top surface 36 of the housing structure and press it against the road surface. As mentioned above, it may be necessary to have more than one pump on the vacuum structure to hold it down on the road surface.

In the activated position, the free length of the cable 76 between the reel and the hook device 46 is preferably long enough so that the housing structure can reach the road surface without requiring any of the cable to be pulled off of the reel. This prevents the cable from pulling the housing structure in a way which would prevent the vacuum from being created in the cup-shaped chamber 30. Once the anchor is adhered to the road surface and the vehicle continues its forward movement, the cable begins to unwind off of the reel 70. The frictional control device 80 associated with the reel regulates the pay-out of the cable and thereby brakes the movement of the vehicle as it moves away from the anchor device. This is a innovation over the prior art because the tire-to-road surface relationship which might be effected by the road surface is not important to the braking of the vehicle. The actual rate at which the vehicle slows down can be regulated by the frictional control device 80. For instance, the cable 76 may be imbedded in a material matrix 82 such as plastic, which requires the cable to be torn out of the material matrix as the reel 70 turns about its axle 74. It should be noted that it is within the scope of the present invention to have a plurality of reels 70 mounted on the vehicle with each having a separate cable connected to the vacuum housing structure 22 in any desirable location. Further, the actual position of the reels and housing structure on the vehicle frame is flexible in accordance with the specific design requirements of the vehicle. In addition, a plurality of the vacuum housing structures may be used as required.

Referring to FIG. 4, there is shown a second embodiment of the present invention wherein the anchor device includes a power-driven bolt structure 100 carrying a bolt 102 therein. The bolt structure 100 is preferably an explosive system which upon ignition drives the bolt 102 out of the bottom 104 of the bolt structure. The end of the bolt 102 has a sharpened point 106 which facilitates it being driven and imbedded into the road surface as explained below. One end of the cable 76 is connected to the bolt by a loop 108 which has an internal diameter smaller than the external diameter of the bolt head 110. It is also within the scope of the present invention to connect the end of the cable 76 to the bolt in any other desired manner such as welding. An actuation device 18 may include a switch 67 which is activated by the operator of the vehicle to explode the bolt 102 out of the bolt structure as required.

In operation, when the operator of the vehicle feels that an emergency braking situation exists, the switch is activated and the bolt driven out of the bolt structure. The sharp point 106 enters the road surface so that the bolt is imbedded into the road. Then the movement of the vehicle forward pulls the cable off the reel in the manner described above and the vehicle is braked in accordance with the frictional control 80 associated with the reel 70.

Figure 7:
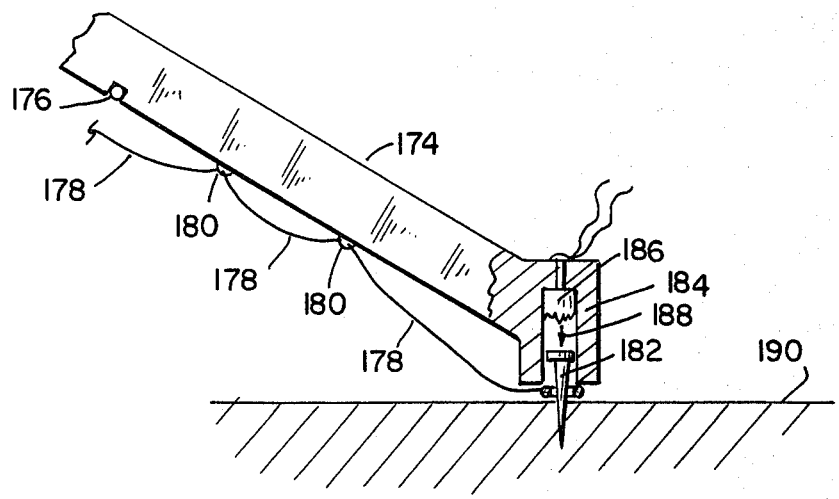
FIG. 7 is an enlarged sectional elevation view showing the cable suspended at spaced intervals from a pivoted arm or pendulum which extends to a terminus in close proximity to the road; as shown, a bolt is exploded into the road surface at a very close proximity, therefore allowing a very thin spike to be used, thus providing less spallation of the road surface.

A further modification of the second embodiment (not shown) includes a pivoted-pendulum which carries an explosive bolt in a housing. When the pendulum is released, it pivots to the road surface and the explosive force thrusts the bolt into the road. This arrangement is shown in FIG. 7, which includes an arm or pendulum 174 which is pivoted at pivot point 176. A cable 178 is suspended from the arm 174 at spaced intervals via loops 180. The cable 178 extends to explosive bolt 182 in housing 184. An explosive charge 186 when ignited exerts a force via arrow 188 which thrusts the bolt 182 into the road 190. This is done when the pendulum 174 has been released so that it pivots to the road surface 190.

A third embodiment of the present invention is illustrated in FIG. 5 and includes an anchor device 16 comprised of a spike structure 120 which is imbedded into the road surface by the weight of the vehicle. The spike structure 120 includes a spike member 122 having one end 124 pivotally connected to the frame of vehicle 12. The end 124 may have a groove 126 which opens at the rear face 128 of the spike member and is sized to receive a pin 130. The pin is supported between two parallel, spaced support elements 132 and allows the spike to easily disengage from the vehicle. Note, the pin 130 and the support elements 132 (only one is shown) make up the separation structure 134 which permits the spike to disengage from the vehicle. The spike member has a shoulder 136 for receiving a loop 108 on the end of the cable 76. Also a pin 138 may be affixed to the spike member for receiving one end of a spring 140. The second end of the spring may be attached to the support element 132. This spring 140 tends to pull the second end 142 of the spike member downward away from the vehicle and towards the road surface. It is within the scope of the present invention to provide any other spring device in any desirable way to force the end 142 of the spike towards the road surface.

An actuation device 150 includes a solenoid operated pin 152 which supports the end 142 of the spike member adjacent the frame of vehicle 12. The actuation device 150 may be activated by the operator of the vehicle by an electrical control as previously described.

In operation, the spike member 122 is carried by the vehicle 12 in the position shown in FIG. 5. At this time, the spring 140 is loaded and tends to pull the end 142 of the spike downwards towards the road surface. In the event that the operater wishes to activate the emergency braking system, an electrical switch may withdraw the solenoid pin 152 away from the pin 142 and permit the spring 140 to force the spike to pivot about its end 124 so that the end 142 sticks into the road surface. Of course, the length of the spike member must be greater than the distance from the pin 130 to the road surface. When the vehicle moves forward, the weight of the vehicle moving over the spike imbeds the latter into the road surface. As the vehicle continues to move forward, the end 124 disengages from the vehicle. This may simply be accomplished by the groove sliding off of the pin 130 and the spring 140 may be of a relatively weak material, such as for example, rubber and thereby break somewhere along its length. Continued movement of the vehicle, causes the cable 76 to unwind from the reel 70 and brake the vehicle as described above. It is within the scope of the present invention to have a plurality of spike structures 120. Also, the separation structure 134 may be constructed in any desirable manner such as with a rubber connector between the vehicle and the spike member which acts to bias the spike end 142 towards the road surface and can easily break or separate to disengage the end 124 from the vehicle.

It can readily be understood by one skilled in the art that there has been provided an emergency braking system which brakes a vehicle independent of the tire-road interface, where the braking force can be controlled, where the system can be independent of the primary braking system, which can be quickly and easily activated, and which is relatively inexpensive to manufacture and install.

While there has been described what is at present to be the preferred embodiments of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An emergency braking system operably associated with a vehicle operated on a road surface comprising:
    anchor means releasably carried by said vehicle for adherence to said road surface;
    actuation means in said vehicle for releasing said anchor means from said vehicle; and
    cable means joining said anchor means to said vehicle for braking the movement of the vehicle when the anchor means is adhered to the road surface, said cable means including a reel rotatably attached to said vehicle for carrying a flexible cable wherein said cable is fixed at one end to said anchor means and at the other end to said reel, frictional control means being associated with said reel to regulate the payout of the cable and thus brake the movement of the vehicle away from the anchor means, said frictional control means including a soft tough material matrix in which the cable is imbedded, whereby the payout of the cable requires the cable to be torn out of the material matrix, said material matrix being of a graded toughness around the reel, with the toughness increasing from the outer periphery of the reel towards the center of the reel, whereby the payout of the cable is at a slower speed as more of the cable is unwound from the reel, so that a relatively smaller deceleration force is encountered when the anchor is first adhered to the road surface.

2. The emergency braking system of claim 1 further characterized in that said anchor means comprises a vacuum housing structure with a pump device thereon to create a vacuum in said housing structure whereby the vacuum housing structure adheres to the road surface.

3. The emergency braking system of claim 2 further characterized in that said actuation means includes a member having a notch thereon extending from a top surface of the housing member, a locking member extending from the vehicle and having a passage way for receiving said member, and pin means carried by said locking member to engage the notch when said member is in said passageway and thereby fasten the member and the locking member together.

4. The emergency braking system of claim 2, further characterized in that the rear edge of said vacuum housing structure furthermost from the front of the car is provided with at least one pump and exhaust passage, or at least one small rocket, so as to provide downward thrust to prevent tilting of the housing structure because of cable tension.

5. The emergency braking system of claim 1 further characterized in that the soft material matrix is composed of solder or plastic.

6. The emergency braking system of claim 1 further characterized in that said anchor means includes explosive bolt means for embedding a bolt into said road surface.

7. The emergency braking system of claim 6, further characterized in that the explosive bolt means is in a housing carried by a pivoted pendulum, so that when said pendulum is released, it pivots to the road surface and the explosive force thrusts said bolt means into the road.

8. The emergency braking system of claim 6 further characterized in that said cable means is joined at one end to said bolt.

9. The emergency braking system of claim 1 further characterized in that said anchor means includes a spike means having a first end pivotally connected to said vehicle, a second end releasably secured to said vehicle by said actuation means, said spike means is longer than the distance from the first end to the road surface and is positioned with the second end closer to the front of the vehicle and the first end closer to the rear of the vehicle, whereby the release of said second end causes the spike means to pivot about said first end so that the second end sticks into the road surface and the weight of the vehicle moving over the spike means embeds the spike means into the road surface.

10. The emergency braking system of claim 9 wherein said first end includes separation means for disengaging said first end from said vehicle.

11. An emergency braking system operably associated with a vehicle operated on a road surface comprising:
    anchor means releasably carried by said vehicle for adherence to said road surface, said anchor means comprising a vacuum housing structure with a pump device thereon to create a vacuum in said housing structure, whereby the vacuum housing structure adheres to the road surface, the rear edge of said vacuum housing structure furthermost from the front of the car being provided with at least one pump and exhaust passage, or at least one small rocket, so as to provide downward thrust to prevent tilting of the housing structure because of cable tension;
    actuation means in said vehicle for releasing said anchor means from said vehicle; and
    cable means joining said anchor means to said vehicle for braking the movement of the vehicle when the anchor means is adhered to the road surface, said cable means including a reel rotatably attached to said vehicle for carrying a flexible cable wherein said cable is fixed at one end to said anchor means and at the other end to said reel, frictional control means being associated with said reel to regulate the payout of the cable and thus brake the movement of the vehicle away from the anchor means.

12. The emergency braking system of claim 11 further characterized in that said actuation means includes a member having a notch thereon extending from a top surface of the housing member, a locking member extending from the vehicle and having a passage way for receiving said member, and pin means carried by said locking member to engage the notch when said member is in said passageway and thereby fasten the member and the locking member together.

13. An emergency braking system operably associated with a vehicle operated on a road surface comprising:

anchor means releasably carried by said vehicle for adherence to said road surface, said anchor means including explosive bolt means for embedding a bolt into said road surface, said explosive bolt means being in a housing carried by a pivoted pendulum, so that when said pendulum is released, it pivots to the road surface and the explosive force thrusts said bolt means into the road;

actuation means in said vehicle for releasing said anchor means from said vehicle; and cable means joining said anchor means to said vehicle for braking the movement of the vehicle when the anchor means is adhered to the road surface, said cable means including a reel rotatably attached to said vehicle for carrying a flexible cable wherein said cable is fixed at one end to said anchor means and at the other end to said reel, frictional control means being associated with said reel to regulate the payout of the cable and thus brake the movement of the vehicle away from the anchor means.

14. The emergency braking system of claim 13 further characterized in that said cable means is joined at one end to said bolt.

15. An emergency braking system operably associated with a vehicle operated on a road surface comprising:

anchor means releasably carried by said vehicle for adherence to said road surface;

actuation means in said vehicle for releasing said anchor means from said vehicle;

said anchor means including a spike means having a first end pivotally connected to said vehicle, a second end releasably secured to said vehicle by said actuation means, said spike means being longer than the distance from the first end to the road surface and being positioned with the second end closer to the front end of the vehicle and the first end closer to the rear of the vehicle, whereby the release of said second end causes said spike means to pivot about said first end so that the second end sticks into the road surface and the weight of the vehicle moving over the spike means embeds the spike means into the road surface; and cable means joining said anchor means to said vehicle for braking the movement of the vehicle when the anchor means is adhered to the road surface, said cable means including a reel rotatably attached to said vehicle for carrying a flexible cable wherein said cable is fixed at one end to said anchor means and at the other end to said reel, frictional control means being associated with said reel to regulate the payout of the cable and thus brake the movement of the vehicle away from the anchor means.

16. The emergency braking system of claim 15 wherein said first end includes separation means for disengaging said first end from said vehicle.

* * * * *